(12) United States Patent
Kiroff

(10) Patent No.: US 7,909,011 B2
(45) Date of Patent: Mar. 22, 2011

(54) PISTON ACTUATING ENGINE FOR COMBUSTING FUEL

(75) Inventor: Sheldon Kiroff, Mason City, IA (US)

(73) Assignee: RX 33, LLC, Mason City, IA (US)

( * ) Notice: Subject to any disclaimer, the term of this patent is extended or adjusted under 35 U.S.C. 154(b) by 345 days.

(21) Appl. No.: 12/132,234

(22) Filed: Jun. 3, 2008

(65) Prior Publication Data

US 2009/0293833 A1 Dec. 3, 2009

(51) Int. Cl.
*F02F 1/00* (2006.01)
(52) U.S. Cl. ............ 123/193.2; 123/662; 123/663; 123/664; 123/657
(58) Field of Classification Search .......... 123/193.1, 123/193.2, 193.3, 193.4, 193.5, 193.6, 657, 123/665, 666, 661, 662, 663, 664
See application file for complete search history.

(56) References Cited

U.S. PATENT DOCUMENTS

| | | | | |
|---|---|---|---|---|
| 1,539,133 A | * | 5/1925 | Markle et al. | 165/51 |
| 2,154,358 A | * | 4/1939 | Ross | 123/41.75 |
| 2,659,355 A | * | 11/1953 | Layland | 123/285 |
| 2,672,135 A | * | 3/1954 | Kosche | 123/253 |
| 3,318,292 A | | 5/1967 | Hideg | |
| 3,408,992 A | * | 11/1968 | Von Seggern et al. | 123/277 |
| 3,987,776 A | * | 10/1976 | Goto et al. | 123/657 |
| 4,635,591 A | * | 1/1987 | Hledin | 123/37 |
| 4,872,433 A | | 10/1989 | Paul et al. | |
| 5,211,153 A | * | 5/1993 | Yonekawa et al. | 123/668 |
| 7,353,797 B1 | | 4/2008 | Breidenthal | |

* cited by examiner

*Primary Examiner* — Michael Cuff
*Assistant Examiner* — Hung Q Nguyen

(57) ABSTRACT

An internal combustion engine having an engine block with a chamber disposed therein containing a reciprocating piston. A head is mounted on the head of the engine block for providing fuel to the chamber. The chamber is designed to have a first end with a first diameter that tapers inward to a second end that has a second diameter that is less than the first diameter and extends into a cylindrical portion such that the reciprocating piston reciprocates within the cylindrical portion.

7 Claims, 1 Drawing Sheet

PISTON ACTUATING ENGINE FOR COMBUSTING FUEL

BACKGROUND OF THE INVENTION

This invention relates to piston actuating engines for combusting fuel. More specifically, this invention relates to an internal combustion engine.

Piston actuated engines that combust fuel are well known in the art. As an example, an internal combustion engine is a well known piston actuated engine and its basic functioning can be seen in various patents including U.S. Pat. No. 3,318,292 to Hideg. Basically, an internal combustion engine has an engine block that has a chamber disposed therein where a reciprocating piston reciprocates within the chamber. A head is typically mounted on the engine block and contains an intake passageway and an exhaust passageway wherein the intake passageway has an intake valve therein and the exhaust passageway has an exhaust valve therein. Additionally, typically disposed within the head is a spark plug that ignites fuel in the chamber. Although typically disposed within the head the intake valve, intake passageway, exhaust valve, exhaust passageway, and spark plug may be located in the engine block or in any position as is known in the art as long as each functions accordingly.

Specifically, in a four cycle type engine the intake valve opens allowing fuel to flow into the chamber. The valve closes and the reciprocating piston compresses the fuel therein at which point in time the spark plug ignites causing the fuel to explode forcing the piston downward to produce work. The exhaust valve then opens and the piston pushes the exhaust gas out of the chamber and once the exhaust valve closes the intake valve is ready to open again for another cycle.

While the internal combustion engine functioning is well known problems still remain. Specifically, internal combustion engines are not 100% efficient wherein large volumes of fuel are required in order to stroke the reciprocating piston downward. With the soaring prices of gasoline any type of reduction in fuel to arrive at desired horsepower for running an engine is desired.

Therefore, a principal object of the present invention is to provide an improved reciprocating piston engine with a chamber design that maximizes efficiency.

Another object of the present invention is to provide a reciprocating engine with an improved chamber design that reduces the fuel consumed to reciprocate a piston.

These and other objects, features, or advantages of the present invention will become apparent from the specification and claims.

BRIEF SUMMARY OF THE INVENTION

An engine for combusting fuel that has an engine block with a chamber for holding fuel disposed therein. Disposed within the chamber is a reciprocating piston that compresses fuel within the chamber. A head is mounted on the engine block for providing fuel to the chamber. The chamber is designed to have a first end with a first diameter and a sidewall tapering from the first end to a second end with a second diameter that is less than the first diameter.

DETAILED DESCRIPTION OF THE PREFERRED EMBODIMENT

Figure 1:
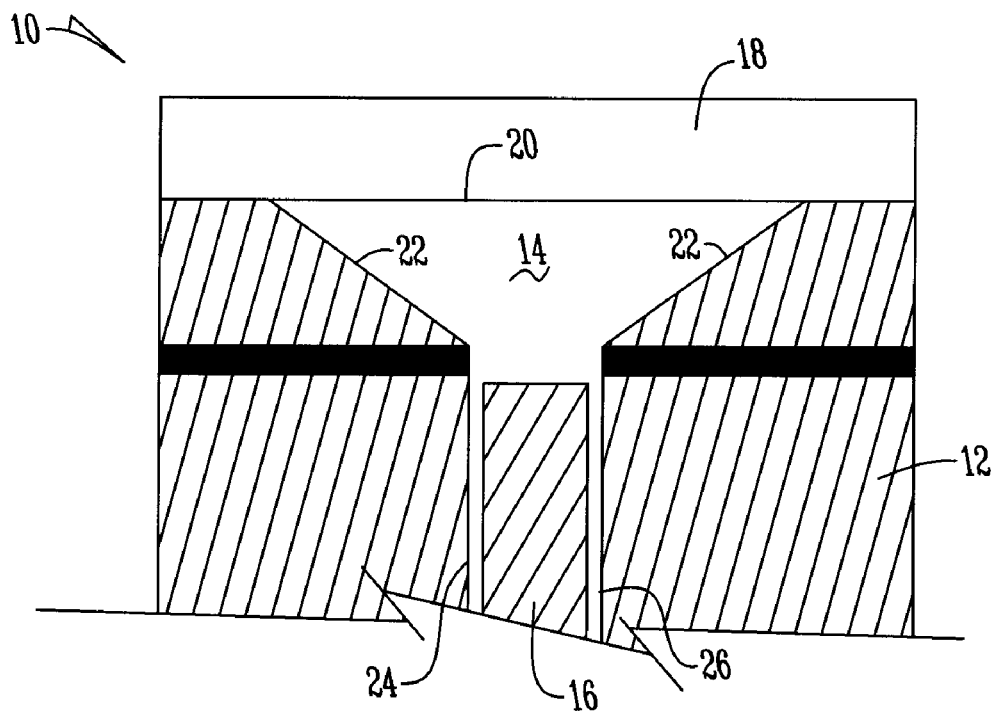
FIG. 1 is a side sectional view of an internal combustion engine.

The figures provide an internal combustion engine 10. While shown as an internal combustion engine 10 in the figures one skilled in the art should appreciate that the present design can be directed toward any piston actuated combusting engine such as a diesel engine or the like. The internal combustion engine 10 has an engine block 12 having a chamber 14 that contains a reciprocating piston 16. Reciprocating piston can be of any size or shape to improve combustion as is known in the art. Mounted onto the engine block 12 is a head 18.

Figure 2:
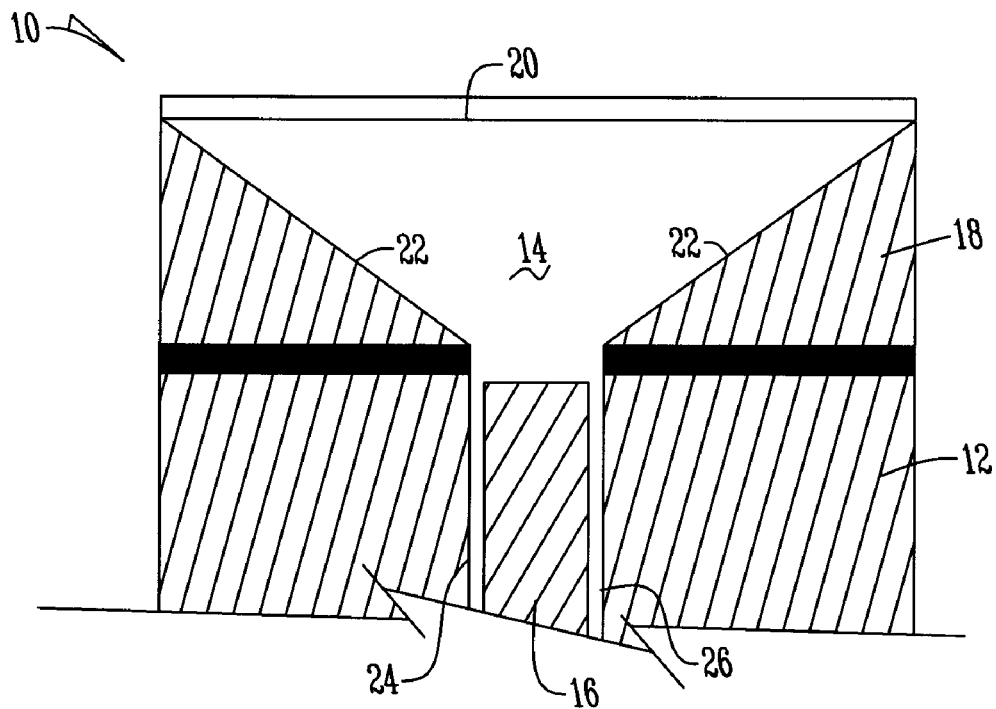
FIG. 2 is a side sectional view of an internal combustion engine.

The internal combustion engines of FIGS. 1-2 do not show the valving and spark plug described in the background of the invention as these features are well known in the art and can be located anywhere in association with the head 18 or engine block 12 regardless of the location of the engine block 12 and head 18. Consequently, because these are conventional features they have not been shown; however, one skilled in the art would understand them to be present to provide fuel into the chamber 14, provide an ignition or spark for the fuel in chamber 14, and to take away exhaust from chamber 14.

The chamber 14 in a preferred embodiment has a frusto-conical shape. The chamber extends from a first end 20 that has a first diameter into an inwardly tapering sidewall 22 that extends towards a second end 24. Specifically, the sidewall 22 terminates at the second end 24 into a cylindrical portion 26. The reciprocating piston 16 reciprocates within the cylindrical portion 26 wherein the reciprocating piston does not reciprocate past the cylindrical portion 26. Additionally, the second end 24 and cylindrical portion 26 has a second diameter that is less than the first diameter of the first end 20. In a preferred embodiment the second diameter is less than half the first diameter.

In operation, an intake passageway (not shown) provides fuel into chamber 14. The reciprocating piston 16 then compresses the fuel in the chamber 14 and a spark plug or the like (not shown) ignites the fuel. When the fuel explodes within chamber 14 the explosion is forced through the reduced diameter of the second end 24 of chamber 14. One will appreciate that the force created by igniting the fuel in the chamber 14 of the present disclosure is the same force when igniting fuel in a typical cylindrical type chamber having the same volume; however, because the internal combustion engine 10 has a chamber 14 with a reduced diameter at its second end 24 the reciprocating piston 16 is moved with greater force producing more horsepower for the internal combustion engine 10. Additionally, the tapered sidewall 22 directs the fuel and explosion toward the second end 24 of the chamber to focus the explosion on the reciprocating piston 16.

Thus provided is a piston actuated engine that is able to provide more horsepower for a predetermined amount of fuel than presently designed piston actuated engines. The design of the chamber 14 improves efficiency and power of the engine 10. Consequently, presented is a shape charged internal combustion engine 10. The chamber 14 shapes the explosion through a smaller opening, hence delivering similar horsepower with a substantial reduction in fuel required. This concept is also applicable to diesel/compression ignition engines. Thus, at the very least all of the stated objectives have been met.

It will be appreciated by those skilled in the art that other various modifications could be made to the device without departing from the spirit and scope of this invention. All such modifications and changes fall within the scope of the claims and are intended to be covered thereby.

What is claimed is:

1. An engine for combusting fuel comprising:
a head mounted on an engine block for providing fuel to a chamber;
a reciprocating piston disposed within the chamber for compressing fuel within the chamber;
wherein the chamber has a first end with a first diameter and a sidewall tapering from the first end to a second end with a second diameter that is less than the first diameter; and
wherein the second end of the chamber extends into a cylindrical portion having a diameter less than the first diameter of the chamber and wherein the piston reciprocates within the cylindrical portion.

2. The engine of claim 1 wherein the chamber has a frusto conical shape.

3. The engine of claim 1 wherein the engine is an internal combustion engine.

4. The engine of claim 1 wherein the piston does not reciprocate past the cylindrical portion.

5. The engine of claim 1 wherein the head is adjacent the first end of the chamber.

6. The engine of claim 1 wherein the head surrounds the sidewall of the chamber.

7. The engine of claim 1 wherein the diameter of the cylindrical portion is less than half the first diameter of the chamber.

* * * * *